Feb. 9, 1965    L. OSTERMAIER    3,169,155
PROCESS AND AN APPARATUS FOR BAKING CERAMIC PRODUCTS
Filed March 22, 1960    3 Sheets-Sheet 1

INVENTOR:
LEO OSTERMAIER
BY Toulmin & Toulmin
ATTORNEYS

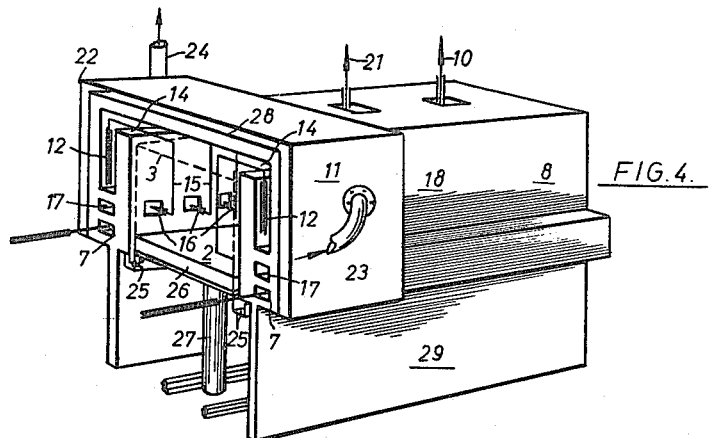
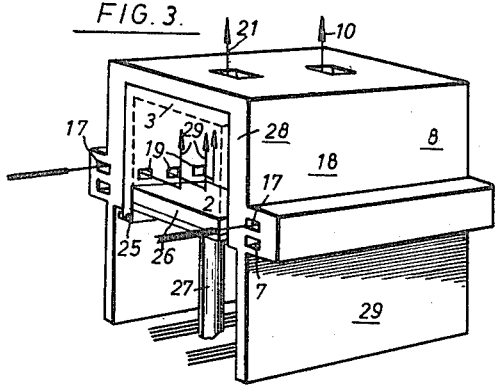
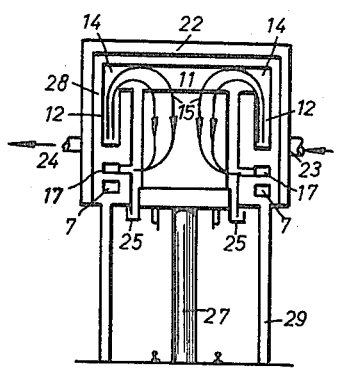
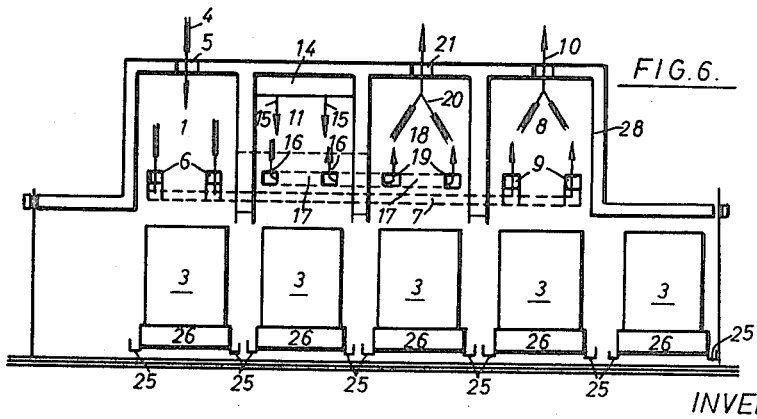

Feb. 9, 1965 L. OSTERMAIER 3,169,155
PROCESS AND AN APPARATUS FOR BAKING CERAMIC PRODUCTS
Filed March 22, 1960 3 Sheets-Sheet 3

INVENTOR:
LEO OSTERMAIER
By Toulmin & Toulmin
ATTORNEYS

3,169,155
PROCESS AND AN APPARATUS FOR BAKING CERAMIC PRODUCTS
Leo Ostermaier, Ehingerstrasse 6, Biberach an der Riss, Wurttemberg, Germany
Filed Mar. 22, 1960, Ser. No. 16,790
Claims priority, application Germany June 6, 1959
2 Claims. (Cl. 264—66)

The present invention concerns a process and an apparatus for baking bricks, ceramic products and so forth, wherein pre-heating, baking and cooling takes place.

It is an object of the invention to provide an apparatus which may be produced at low cost and a process which effect perfect baking with a low scrap quota in a short time and with a low fuel consumption.

According to the present invention the cooling of the baked articles is effected by a supply of cooling air and by pre-heating the articles to be baked by means of the hot cooling air to be discharged in one operation, while in another simultaneous operation the pre-baked articles are baked by means of the supplied baking air and the preliminary baking of the pre-heated articles effected by means of the baking air being discharged.

According to this feature a product, namely a baked brick is obtained in timed succession in procedure intervals in a way which has not hitherto been customary.

The most essential distinguishing feature of the invention relative to known brick kilns is that no draught or suction producing devices whatsoever are employed for conducting the heating gases, but that these are supplied to the baking chambers under pressure by means of blowers. Hence, firstly, the excess of air, which in all hitherto used kilns has been found to be uneconomical as a result of being uncontrollable, is adjusted directly to the theoretical air requirements, thereby obtaining maximum economy; and secondly the invention avoids the occurence of dead corners with insufficient baking capacity and prevents the entry of unwanted cold air from the outer atmosphere and harmful effects attendant thereon.

Due to heated air used for cooling the baked articles being used for pre-heating the new batch of articles to be baked is pre-heated with air which is free of oxide, since the articles already baked no longer emit particles of oxide or other substances which could have a detrimental effect on the fresh batch to be baked. Moreover, instead of using an air circulation the hot air leaving the articles to be baked after they have been cooled (heated cooling air), which is free of oxide, may, for example, be used for the space heating. The simultaneous operation carried out parallel thereto uses the combustion air which, for example, may be mixed with coal dust or with combustion gases, effects the actual combustion in order now to preliminarily bake the articles which have already been pre-heated. These pre-heated articles already however have such a temperature that again, air containing oxide cannot cause any harm. Contrary to known processes a fourth operation is added, and in fact to the pre-heating, namely that of pre-baking. In known processes the operation of pre-heating, pre-baking, baking and cooling are caused to merge continuously with the rising temperature one into the other. Oxygen is thus supplied by the secondary furnace to the main furnace via the baked articles to be cooled and thereby substantially consumed. Now, in order also to provide the required oxygen supply for the preliminary furnace it is necessary to operate with a correspondingly large supply of fresh air, which amounts to a multiple of the theoretical air requirement and this has an extremely unfavorable effect on the efficiency of the combustion.

In the process of the invention, however, only those operational stages which are unable to have a detrimental effect on one another are interconnected, i.e. cooling with pre-heating and baking with pre-baking.

It is possible for the housing to be composed of an upper section including the actual vaults and a lower section which prevents fresh air from entering during re-loading with articles to be baked, the lower section as the base being provided with a turntable and having a loading door at the side.

Such a design results in considerable economy in materials, labor and operating time. The trolleys carrying the articles to be baked are pushed into the lower section of the housing; this housing is insulated to be heat resistant only enough to prevent the baked pre-heated or pre-baked articles from cooling off too much. The section disposed thereabove is heavily heat-insulated. Since heat rises, this design is expedient as to a certain extent it has a bell shaped, i.e. a screening effect. The articles to be baked or the trolleys carrying the articles stacked thereon are pushed from the bottom to the top and back again into the actual baking, cooling, pre-heating and pre-baking vaults. The turntable is turned on a fraction after each operational stage.

It is also possible for the pre-heating, pre-baking, baking and cooling vaults to be arranged in tandem on a frame and a track below the vaults also permits the articles to be baked to be shifted and inserted and removed by means of devices, a common housing serving to surround the track and the vaults.

Instead of the turntable the apparatus is now designed to have the vaults arranged in tandem.

It is important for rams to be fitted beneath the track below the vault openings and for the trolleys carrying the articles to be baked to be provided with base plates for the articles to be baked, which plates, when the trolleys ascend, seal off the vault openings to keep the heat in.

Thus in this design the base or base plate of the trolley simultaneously acts as lower closure for the vault opening.

To prevent loss of heat covers are preferably provided in the vaults supported on the baked articles, which covers, when the articles are slid out, by resting on shoulders seal off the aperture of the empty vault to keep the heat in.

This design automatically ensures that the stack of articles moving out seals themselves from the baking, pre-heating, pre-baking or cooling vault. This prevents the vault from cooling off and the brickwork has a longer life.

It is moreover expedient for the vaults to be provided with a sheet metal jacket which, by leaving a space subjected to an excess air pressure, surrounds the brick lining at the top and at the sides.

Such a design prevents combustion gases from penetrating to the outside, due to the excess air pressure surrounding the vault, the latter being effectively closed with regard to combustion gas, even if excessive pressure is injected, since the higher excess pressure in the space surrounding the baking vault is used to prevent any gases from escaping into the outer atmosphere.

It is important for the arrangement of the burner that the baking vault should have laterally disposed hollow spaces adapted to receive the burners and which are formed by partitions which at the top permit an overflow of baking air and that for discharging the baking air traversing the articles to be baked, lateral outlet apertures are arranged at the lower end of the vault.

Such a design permits the burner flame to be operated in a space in which there are no articles to be burnt. The baking gases themselves impinge on the articles to be baked which have already been pre-heated or pre-baked to such an extent so as to prevent the formation of residues, such as carbon and so forth, since the dew point, which would promote such a deposit, has been vastly exceeded.

The cooling vault is provided at the top with apertures for the cooling air and at the bottom with discharge apertures which conduct the heated cooling air to the pre-heating vault via the communication ducts.

The principle involved is such where the heat exchange is carried out in contra-flow, i.e. the particular cooling or baking vault which radiates heat to the vault communicating therewith, is traversed in one direction and the other vault in the other direction. The waste gases from the pre-baking vault become available for further use, while the hot air coming out of the pre-heating vault can be used either for the preliminary drying of the fresh batch of articles for baking or, however, for space heating purposes, since its is free of oxide.

A further possibility consist in several cooling vaults being arranged in tandem and the heated air leaving the pre-heating vault being conducted into the drying vaults.

It is expedient moreover, for the baking vault to be provided at the top with inlet apertures for the baking gases and at the bottom with outlet apertures and communicating ducts, which conduct the baking gases still in a hot state at the bottom into the pre-baking vault, which at the top has discharge apertures to the chimney connection.

To obtain a sealed closure of the vault opening it is necessary for the bottom adapted to receive the stacks to be provided with a circular packing wall into which packing ledges mounted on the undersides of the vaults are caused to project when the articles to be baked are led into the vaults by means of the ram.

It is essential moreover that the upper section of the housing adapted to accommodate the vaults should have all the communicating ducts, regulating flaps, chimney connections and air connections and be supported on the lower section constructed as a lined framework.

In a preferred construction in accordance with the invention it is convenient for tracks to be provided beneath the vault openings and for the trolleys bearing the stacks to be moved on the tracks to below the vault openings and on to the rams, guide devices being provided for fixing the trolleys in position.

In order to permit the radiated heat to be better utilised it is convenient to provide a first perliminary drying vault subjected to a vacuum surrounded by a hermetically sealed housing and to cause the gases emanating from the pre-baking vault to flow through this housing.

The preliminary vacuum drying of the articles to be baked has the advantage that water evaporates even at low temperatures. The gases from the preliminary baking vault which in turn are hot must not come into contact with the fresh batch of articles for baking, and hence are arranged to transmit their heat via the hermetically sealed housing which surrounds the vault. The space in which the articles to be baked are disposed is maintained under vacuum by means of a vacuum pump known per se.

It is furthermore convenient for a second preliminary drying vault to be provided in which the articles to be baked arriving from the first preliminary drying vault are dried by means of the air emanating from the preliminary heating vault.

The articles to be baked, which have been dried in the vacuum, have now been dried by means of warm hot air to such an extent as to cause them to be sufficiently pressure resistant so that they may be readily stacked. Such a step and first and second preliminary drying carried out in separate operations and the subsequent preliminary heating and pre-baking prepare the articles to be baked for the baking process.

It is possible for the vaults to be arranged one above the other and for the upper vaults to be arranged and above the other and for the upper vaults being charged from above through apertures to be covered by removable lids.

Depending upon space conditions it is possible for an arrangement to be chosen, wherein the articles to be baked are lifted up by means, for example, of a crane arrangement and the hot air following through from below to be prevented from escaping at the second pre-drying vault by means of the base plate carrying the articles to be baked travelling upwards therewith, as this base plate or the lower part of the trolley simultaneously forms a closure. It is possible, of course, to omit such a closure when the hot air supply from below into the pre-heating vault is interrupted. The various vaults may also be arranged in such a way that the weights are compensated as with a balance beam, i.e. when one stack of articles for baking has been removed the stack disposed on the other end of the balance beam or a tension cable is then lowered, e.g. into the preliminary drying vault, which is loaded in an upward direction, whilst when the pre-dried articles are removed the reverse takes place and the articles to be baked arrive in the pre-heating vault. In this case it is also possible to use all other constructions of dependent feeding, it being possible for the feed to be effected by hydraulic means or tension cables or laterally feed or discharge the kiln.

It is convenient moreover for the stacks with their base plate to be detachably mounted on the lower frame of the trolley.

This design is convenient when the whole trolley chassis is to be prevented from being carried along therewith; in an individual case, of course, it could even be better for the base plate to be connected with the trolley chassis.

When using a turntable as the base plate it is important for the rams to be individually displaceable in a vertical direction and for the turntable to be supported on externally disposed wheels and a central bearing.

Such a design ensures maximum operational reliability compatible with a simple structure.

The invention will be described further, by way of example, with reference to the accompanying drawings, in which:

FIG. 3 is a perspective view of the pre-baking vault mounted in front of the pre-heating vault, on the section line II—II of FIG. 1;

FIG. 4 is a perspective view showing the baking vault cut open along the line III—III of FIG. 1; and also an external view of the pre-baking and pre-heating vault;

FIG. 6 is a view corresponding to FIG. 5 showing the kiln before tht start of the baking operation;

FIG. 7 is a cross section through the baking vault along the line IV—IV of FIG. 5;

Figure 1:
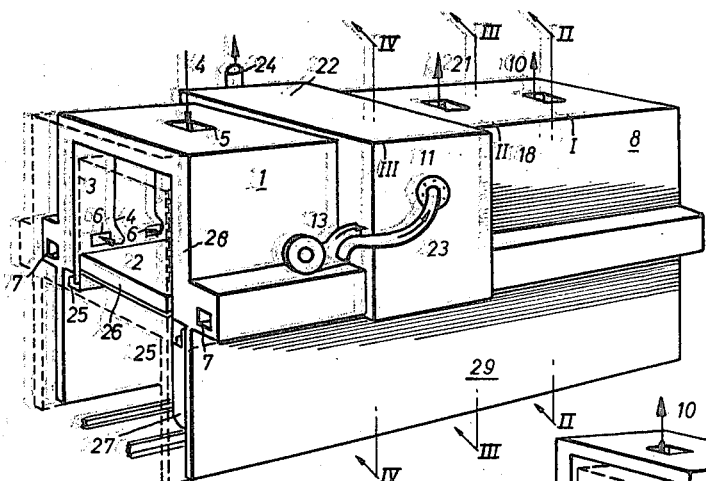
FIG. 1 is a perspective view of a kiln cut open at the front and having four vaults arranged in tandem.
Figure 2:
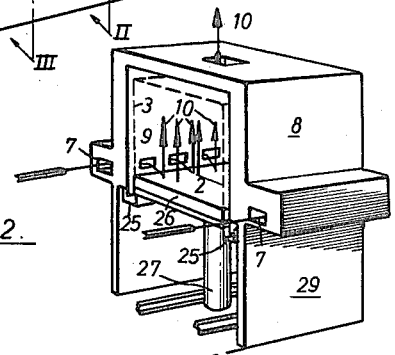
FIG. 2 is a perspective view showing the pre-heating vault cut open on the line I—I of the kiln of FIG. 1.

FIG. 1 is a sectional perspective view of the cooling vault 1. The stack 3 of articles to be baked, indicated by broken lines is disposed on a base plate 2 and situated in the cooling vault. The cooling air which, e.g. has been drawn in from the open air, enters in the direction of the arrow 4 through the inlet opening. This cooling air traverses the stack of articles to be baked downwardly from above so as to arrive in the communicating duct 7 through the outlet openings 6. This air now present in the communication duct has been preheated as a result of having cooled the stack of articles to such an extent that, as shown by FIG. 2, it is used in the pre-heating vault 8, entering the vault 8 through the inlet apertures 9 where it is caused to traverse the stack 3 of articles to be pre-heated upwardly in the direction of the arrow 10, the air then leaving the preheating vault 8 at the top (in the direction of the arrow 10). If necessary, this air may then be used in other compartments for heating purposes or, also for pre-drying stacks of articles, since the air is free of oxide. Thus, the cooling vault 1 and pre-heating vault 8 are interconnected by means of the communication duct 7 and are interdependent in their operation.

The main baking vault 11 has a furnace vault 12 into which the burner 13 projects for introduction of thermal energy thereto. The hot baking gases arrive through overflow slots 14 and traverse the stack 3 of articles to be baked in the direction of the arrow 15, i.e. from above downwardly and then through outlet slots 16 at the flue duct 17. From the flue gas duct 17 the baking gases, which are still hot, then enter at the pre-baking vault 18 which is shown in FIG. 3 through the inlet apertures 19. The direction arrow 20 indicates that in this case the articles 3 are traversed from below upwardly, until the oxide containing fuel gases escape through the outlet apertures 21 to be used again in other systems, to cause them finally to transmit their heat, possibly even indirectly. These fuel gases however are oxide containing and cannot therefore be used for all purposes. Thus in this process the main baking vault 11 and the pre-baking vault 18 are interconnected by means of the flue gas duct 17, and in this case, as in the cooling vault 1 and the pre-heating vault 8, the articles to be baked or the stack 3 of articles are traversed in each vault in different directions. This change of traversing directions thus results in a uniform heating or cooling of the articles on all sides. The main baking vault 11 is surrounded by a sheet metal jacket 22. This sheet metal jacket has an air inlet 23 which is branched off the combustion air which is supplied to the burner 13 by a blower. As evident from FIG. 7, in the space formed between the sheet metal jacket and the furnace of the main baking vault 11 excess pressure in relation to the pressure prevailing in the main baking vault 11 is caused by the air entering at the inlet apertures 23 and leaving by the outlet apertures 24. By means of suitable valve flaps and pressure distribution between the main baking vault and this air space defined by the sheet metal jacket 27 may be adjusted so that the possible escape of fuel gases from the main baking vault 11 can be safely prevented. Regulating flaps for distributing the pressure can be fitted at the outlet aperture 24.

Figure 5:
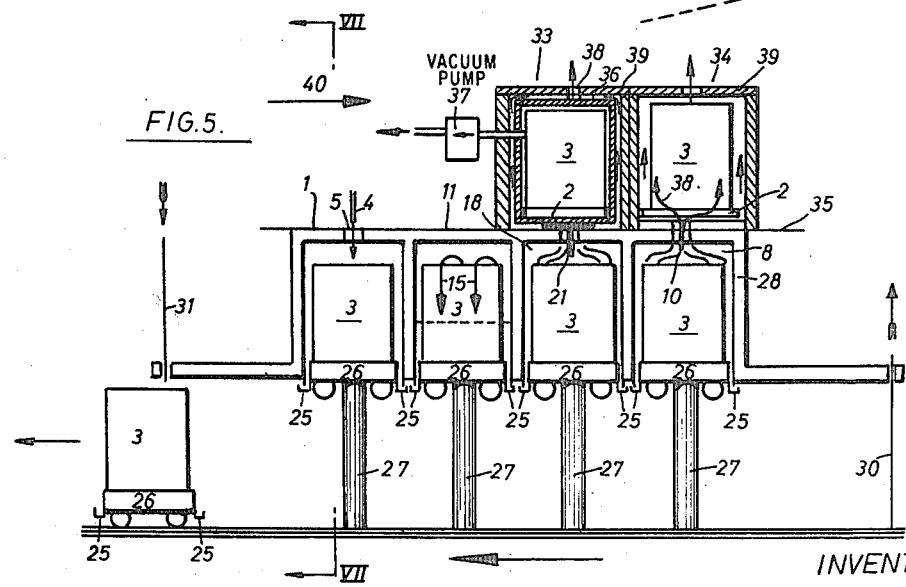
FIG. 5 is a diagrammatical longitudinal section of the four vaults of the kiln during the baking operation with two additional pre-drying vaults.

As shown in FIGS. 5 to 7 trolleys 26 are provided which are provided with sand cups 25 encircling them. The stack of articles to be baked with their base plates 2 are deposited on these trolleys (not shown in FIG. 1 to 4). A lifting device 27 serves to load the trolleys 26 with the stacks 3 of articles, as shown in FIG. 5, into the vaults 1, 11, 18, 8. In this case the same numerals denote the same parts in these figures. The sand cups 25 which engage in counterparts of the vaults to create a labyrinth-like packing form the heat seal in a downwardly direction. The vaults are surrounded by masonry 28; the lower part 29 is situated below in the region of the tracks for the trolleys. Sliding doors 30, 34 permit the introduction of a new stack of the articles to be baked when the sliding door 30 is raised and the removal of the stack of baked articles when the sliding door 31 is raised. During operation both sliding doors 30, 31 are lowered and cooling air is induced from the space defined by the lower part to cause the lifting devices 27 to be cooled by the cooling air sweeping past, this air then being used for the cooling vault 1. The direction of operation is shown by the arrow 32, i.e. the stacks of 3 of articles to be baked are raised into the vaults and when being lowered as shown in FIG. 6, the fresh stack of articles arrives in the pre-heating vault 8 and the baked and cooled stack from the cooling vault 1 arrives in the open.

FIG. 5 illustrates the possibility of heat utilization by means of pre-drying vaults, articles 3 to be pre-dried also being shown, and a first pre-drying vault 33 being mounted adjacent to a second pre-drying vault 34. It is possible for an intermediate platform 35 to be provided which accommodates pre-drying vaults. Of course the pre-drying vaults may also be provided at other points. It is essential for the outlet aperture 21 of the pre-baking vault 18 to be connected with a gastight housing 36, which surrounds the first pre-drying vault; the emerging fuel gases heat this gastight housing like an autoclave and a vacuum pump 37 projects the vault in which the stack 3 is disposed to a vacuum, so that even at low temperaures the moisture contained in the articles is caused to evaporate. The direction of the arrow 38 of the first pre-drying vault permits the fuel gases to escape after having been cooled to such an extent that further utilization would hardly be successful, although of course by means of indirect heating of further heat exchangers such further utilization would be readily possible.

The second pre-drying vault is connected with the pre-heating vault 8, the hot air emerging in the direction of the arrow 10 traversing the stack of articles in the direction of the arrow 38, inlet and outlet slots being arranged in a similar manner to the arrangement in the pre-heating vault 8. The pre-drying vaults 33, 34 may be provided with removable lids 39, hence for example enabling the vaults to be loaded from above. The direction of operation in the pre-drying vaults is indicated by the direction of the arrow 40, i.e. it is opposite to that of the vaults below.

Figure 8:
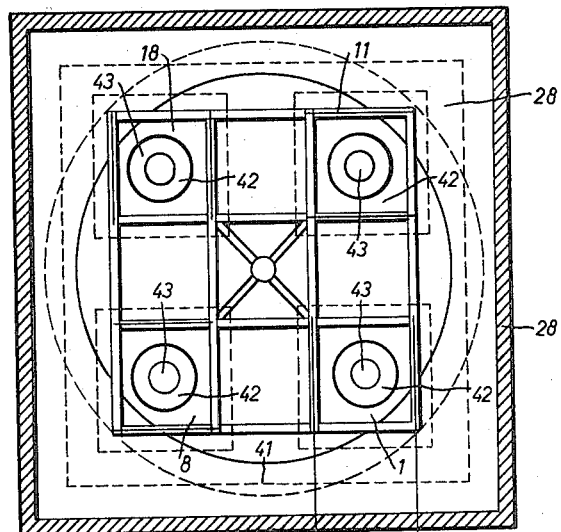
FIG. 8 is a plan showing a kiln having a rotating circular base plate and rams for loading.
Figure 9:
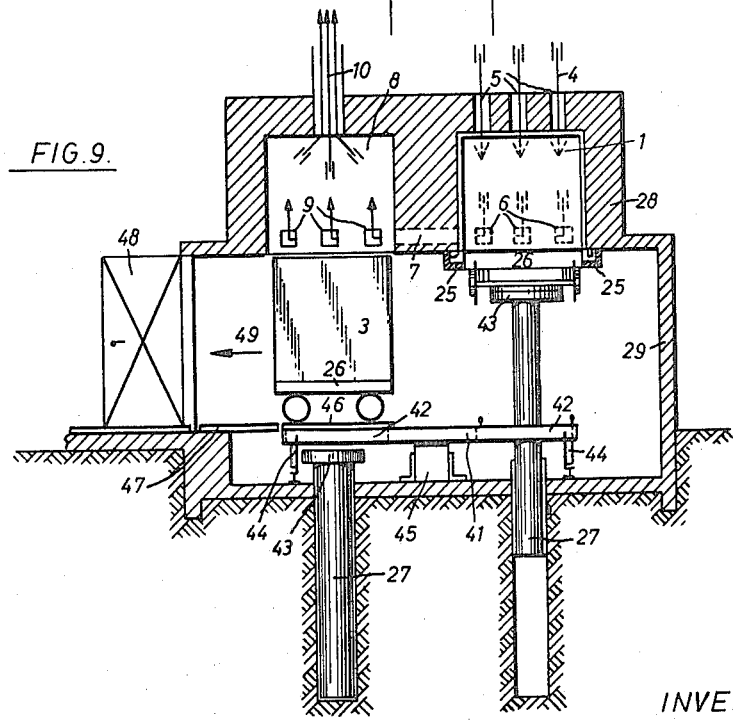
FIG. 9 is a vertical section through the kiln of FIG. 8 showing one ram in the operative postion and one ram in the inoperative position.

FIGS. 8 and 9 show an embodiment having a circular baseplate, this design being selected in circumstances for reasons of space, when it is not possible for the vaults to be arranged in tandem. In FIGS. 8 and 9 identical numerals denote identical parts. In this case a turntable 41 is provided which has four recesses 42 to allow the ram surfaces 43 of the lifting device arranged beneath the turntable 41 to slide the trolleys 26 out of or into the vaults. The turntable 41 has outwardly disposed wheels 44 and a bearing 45 in the center. Tracks 46 are mounted on the turntable and by means of corresponding notches register with the supply tracks 47 when, as shown in FIG. 9, the stack 93 of articles is to be brought out in the direction of the arrow 49 into the open through the charging door 48. Otherwise the procedure is the same, i.e. the charging door 48, a stack of articles, which may for instance be pre-dried, is brought into the circuit on trolleys 26 and when the turntable has been advanced four times in stages the completely baked and cooled stack is taken out, the new stack introduced, and a new cycle of operation is commenced.

The invention includes within its scope all possibilities wherein the cooling vault, pre-heating vault, pre-baking vault and main baking vault in one operation are interconnected by means of cooling or baking air passing therethrough and arrangements including vaults, containers or the like, which, instead of being arranged in tandem, may be arranged in a circle or even one above the other or any other way.

What we claim is:

1. A method for baking and cooling bricks and ceramic products in kilns having a first predrying vault, said first predrying vault being under a vacuum and being surrounded by a gastight housing, a second predrying vault, a preheating vault, a prebaking vault, a baking vault and a cooling vault, said vaults being separate from each other, where the baking and cooling takes place in a total of four simultaneously occurring operations, said operations being preheating, prebaking, baking and cooling, comprising the step of preheating occurring in the preheating vault by means of the heated cooling air received from the cooling vault, the step of prebaking occurring in the prebaking vault by means of the gases received from the baking vault, said air and gases passing through once, the air and gas stream being blown from above downwardly, and the step of heating the first predrying vault by allowing heating gas from the prebaking chamber to enter into said gastight housing from below upwardly.

2. The method according to claim 1, further comprising the step of moving heated air received from the preheating vault through the ceramic products to be baked from below upwardly, directly after said products to be baked were in the first predrying vault.

References Cited in the file of this patent

UNITED STATES PATENTS

| | | |
|---|---|---|
| 424,246 | Anderson | Mar. 25, 1890 |
| 816,385 | Scott | Mar. 27, 1906 |
| 1,690,555 | Schulenberg | Nov. 6, 1928 |
| 1,750,468 | Hauman | Mar. 11, 1930 |
| 1,809,628 | Johnson | June 9, 1931 |
| 1,836,795 | Gregg | Dec. 15, 1931 |
| 1,859,507 | Hanley | May 24, 1932 |
| 1,946,270 | Breaker | Feb. 6, 1934 |
| 1,963,846 | Ipsen et al. | June 19, 1934 |
| 2,502,940 | Gelbman | Apr. 4, 1950 |
| 2,750,274 | Lellep | June 12, 1956 |
| 2,899,189 | Matis et al. | Aug. 11, 1959 |
| 2,975,499 | Lapp | Mar. 21, 1961 |
| 2,980,412 | Koerner | Apr. 18, 1961 |